US012664998B2

(12) United States Patent
Chen et al.

(10) Patent No.: US 12,664,998 B2
(45) Date of Patent: Jun. 23, 2026

(54) MULTI-SPEAKER OVERLAPPING VOICE DETECTION METHOD AND SYSTEM THEREOF

(71) Applicant: CENTRAL CHINA NORMAL UNIVERSITY, Hubei (CN)

(72) Inventors: Zengzhao Chen, Hubei (CN); Zhifeng Wang, Hubei (CN); Baolin Yi, Hubei (CN); Jiangbo Shu, Hubei (CN); Shengming Wang, Hubei (CN); Xinxing Jiang, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 128 days.

(21) Appl. No.: 18/788,092

(22) Filed: Jul. 29, 2024

(65) Prior Publication Data

US 2025/0046336 A1 Feb. 6, 2025

(30) Foreign Application Priority Data

Jul. 31, 2023 (CN) ......................... 202310963031.6

(51) Int. Cl.
*G10L 25/78* (2013.01)
*G10L 21/0272* (2013.01)
*G10L 25/30* (2013.01)

(52) U.S. Cl.
CPC .......... *G10L 25/78* (2013.01); *G10L 21/0272* (2013.01); *G10L 25/30* (2013.01)

(58) Field of Classification Search
CPC ..... G10L 25/78; G10L 21/0308; G10L 25/51; G10L 21/0272; G10L 25/30; G10L 21/0208; G10L 21/0264; G10L 25/03; G10L 25/24; G10L 2021/02087; G06N 3/044; G06N 3/045
See application file for complete search history.

(56) References Cited

U.S. PATENT DOCUMENTS

2018/0336880 A1* 11/2018 Arik ........................ G10L 25/30
2022/0375492 A1* 11/2022 Grangier ................. G10L 25/78

FOREIGN PATENT DOCUMENTS

CN 112992155 A * 6/2021 ............. G06N 3/048
CN 116153291 A * 5/2023 ............. G10L 15/02
CN 111640456 B * 8/2023 ............. G10L 25/51

* cited by examiner

*Primary Examiner* — Yogeshkumar Patel
(74) *Attorney, Agent, or Firm* — JCIPRNET

(57) ABSTRACT

Disclosed are a multi-speaker overlapping voice detection method and a system. The method includes: obtaining a voice to be detected, and removing silence from the voice to be detected is removed; extracting a feature of the voice to be detected after silence removal to obtain a voice feature of the voice to be detected; and inputting the voice feature into an overlapping voice detection model to obtain an overlapping speaker number corresponding to the voice to be detected output by the overlapping voice detection model. The overlapping voice detection model is obtained by supervised training based on a voice feature of a sample voice and a corresponding label of the overlapping speaker number, extracts an embedding of the voice feature, and classifies the overlapping speaker number to obtain the overlapping speaker number of the voice to be detected based on the extracted speaker embedding.

14 Claims, 7 Drawing Sheets

MULTI-SPEAKER OVERLAPPING VOICE DETECTION METHOD AND SYSTEM THEREOF

CROSS-REFERENCE TO RELATED APPLICATION

This application claims the priority benefit of China application serial no. 202310963031.6, filed on Jul. 31, 2023. The entirety of the above-mentioned patent application is hereby incorporated by reference herein and made a part of this specification.

BACKGROUND

Technical Field

The disclosure relates to a technical field of voice processing, and in particular to a multi-speaker overlapping voice detection method and a system thereof.

Description of Related Art

With the rapid development of information technology, artificial intelligence technology has also been improved in various fields. Recently, the research on speaker logs (segmentation and clustering) has also been widely conducted. However, most studies ignore the overlapping audio in audio and do not consider the impact of overlapping audio. In daily meetings or classrooms, there are many cases where the audio of speakers overlapping. Moreover, many studies have found that overlapping voice detection can greatly improve the accuracy of speaker logs.

The existing overlapping voice detection research usually judges the overlapping and non-overlapping of audio, but is unable to determine how many speakers speak simultaneously in the overlapping audio, which has certain limitations. Determining how many speakers speak simultaneously is very helpful for analyzing the extent of confusion in classrooms and meetings, speaker logs, and research on overlapping perception.

SUMMARY

In view of the defects of the related art, the object of the disclosure is to provide a multi-speaker overlapping voice detection method and a system thereof, aiming to solve a problem that a conventional overlapping voice detection method may not detect a number of speakers speaking simultaneously in an overlapping voice.

To achieve the above objectives, in a first aspect, the disclosure provides a multi-speaker overlapping voice detection method. The method includes the following steps. A voice to be detected is obtained, and removing silence from the voice to be detected is removed. A feature of the voice to be detected is extracted after the silence removed, to obtain a voice feature of the voice to be detected. The voice feature is input into an overlapping voice detection model to obtain an overlapping speaker number corresponding to the voice to be detected output by the overlapping voice detection model. The overlapping speaker number represents a number of speakers speaking simultaneously in the voice to be detected. The overlapping voice detection model is obtained by a supervised training based on a voice feature of a sample voice and a corresponding label of the overlapping speaker number, and the overlapping voice detection model extracts an embedding of the voice feature and classifies the overlapping speaker number to obtain the overlapping speaker number of the voice to be detected based on the overlapping speaker number classified by an extracted speaker embedding.

In an optional example, the overlapping voice detection model includes an embedding extraction model and an overlapping speaker number classification model. The embedding extraction model is trained based on following steps. A first classification model is trained based on the voice feature of the sample voice and the corresponding label of the overlapping speaker number, where the first classification model includes an embedding extraction part and a classification part. The embedding extraction part of the trained first classification model is used as an embedding extraction model. The overlapping speaker number classification model is trained based on following steps. The voice feature of the sample voice is input into the embedding extraction model to obtain a sample speaker embedding. A second classification model is trained to obtain the overlapping speaker number classification model based on the sample speaker embedding and the corresponding label of the overlapping speaker number.

In an optional example, the first classification model sequentially includes five layers of time-delay neural networks, one statistical pooling layer, two layers of fully connected layers, and one activation function layer, wherein the five layers of time-delay neural networks, the one statistical pooling layer, and a first fully connected layer are the embedding extraction part, and the rest are the classification part.

In an optional example, the second classification model sequentially comprises four layers of one-dimensional convolutional neural networks, two layers of long and short-term memory recurrent neural networks, one fully connected layer, and one activation function layer.

In an optional example, the sample voice includes a sample individual voice of a single speaker and a sample overlapping voice of multiple speakers. The sample individual voice and the sample overlapping voice are obtained based on following steps. An individual voice of any speaker is divided into various sub-bands, and the silence form the individual voice of any speaker is removed based on an energy of each sub-band and a preset energy threshold. A data set is constructed based on an individual voice of each speaker after the silence is removed. An individual voice of a single speaker is selected from the data set as a sample individual voice. An individual voice of the speakers randomly is selected from the data set and superimposed to obtain the sample overlapping voice of the speakers.

In a second aspect, a multi-speaker overlapping voice detection system includes a voice processing module, a feature extraction module, and an overlapping voice detection module. The voice processing module is configured to obtain a voice to be detected and remove silence from the voice to be detected. The feature extraction module is configured to extract a feature of the voice to be detected after the silence is removed, so as to obtain a voice feature of the voice to be detected. The overlapping voice detection module is configured to input the voice feature into an overlapping voice detection model to obtain an overlapping speaker number corresponding to the voice to be detected output by the overlapping voice detection model, where the overlapping speaker number represents a number of speakers speaking simultaneously in the voice to be detected. An overlapping voice detection model is obtained by a supervised training based on a voice feature of a sample voice and a corresponding overlapping speaker number label, the overlapping voice detection model performs embedding extraction on the voice feature, and classifies the overlapping speaker number based on an extracted speaker embedding to obtain the overlapping speaker number of the voice to be detected.

In an optional example, the overlapping voice detection model includes an embedding extraction model and an overlapping speaker number classification model. Correspondingly, the system further includes an embedding extraction training module and a classification training module. The embedding extraction training module is configured to train a first classification model based on the voice feature of the sample voice and a corresponding label of the overlapping speaker number, where the first classification model comprises an embedding extraction part and a classification part; and use the embedding extraction part of the trained first classification model as an embedding extraction model. The classification training module is configured to input the voice feature of the sample voice into the embedding extraction model to obtain a sample speaker embedding, and train a second classification model to obtain an overlapping speaker number classification model based on the sample speaker embedding and the corresponding label of the overlapping speaker number.

In an optional example, the first classification model of the embedding extraction training module sequentially includes five layers of time-delay neural networks, one statistical pooling layer, two layers of fully connected layers, and one activation function layer, wherein the five layers of time-delay neural networks, the one statistical pooling layer, and a first fully connected layer are the embedding extraction part, and the rest are the classification part.

In an optional example, the second classification model of the classification training module sequentially comprises four layers of one-dimensional convolutional neural networks, two layers of long and short-term memory recurrent neural networks, one fully connected layer, and one activation function layer.

In an optional example, the sample voice includes a sample individual voice of a single speaker and a sample overlapping voice of the speakers. The system further includes a sample voice acquisition module and is configured to divide the individual voice of any speaker into various sub-bands, remove the silence form an individual voice of any speaker based on an energy of each sub-band and a preset energy threshold, construct a data set based on an individual voice of each speaker after silence removal, select an individual voice of a single speaker from the data set as a sample individual voice, and select an individual voice of the speakers randomly from the data set and superimpose to obtain the sample overlapping voice of the speakers.

DESCRIPTION OF THE EMBODIMENTS

In order to make the purpose, technical solutions, and advantages of the disclosure comprehensible, the disclosure is further described in detail below in conjunction with the accompanying drawings and embodiments. It should be understood that the specific embodiments described herein are only used to explain the disclosure, and are not used to limit the disclosure.

The purpose of the disclosure is to detect and identify overlapping audio of an overlapping voice detection algorithm based on an x-vector (that is, a speaker embedding). Whether it is a study of speaker logs or a study of overlapping perception, detecting the overlapping audio can improve the prediction accuracy of a model. The detection and the identification are based on the differences in acoustic features between the overlapping audio and non-overlapping audio and the differences in overlapping speakers. Only when the detection is accurate enough may other research be conducted later, such as meeting research on the extent of meeting voice and discussions, and a classroom-related analysis of the conversations between teachers and students and the discussions of the students may be done.

Figure 1:
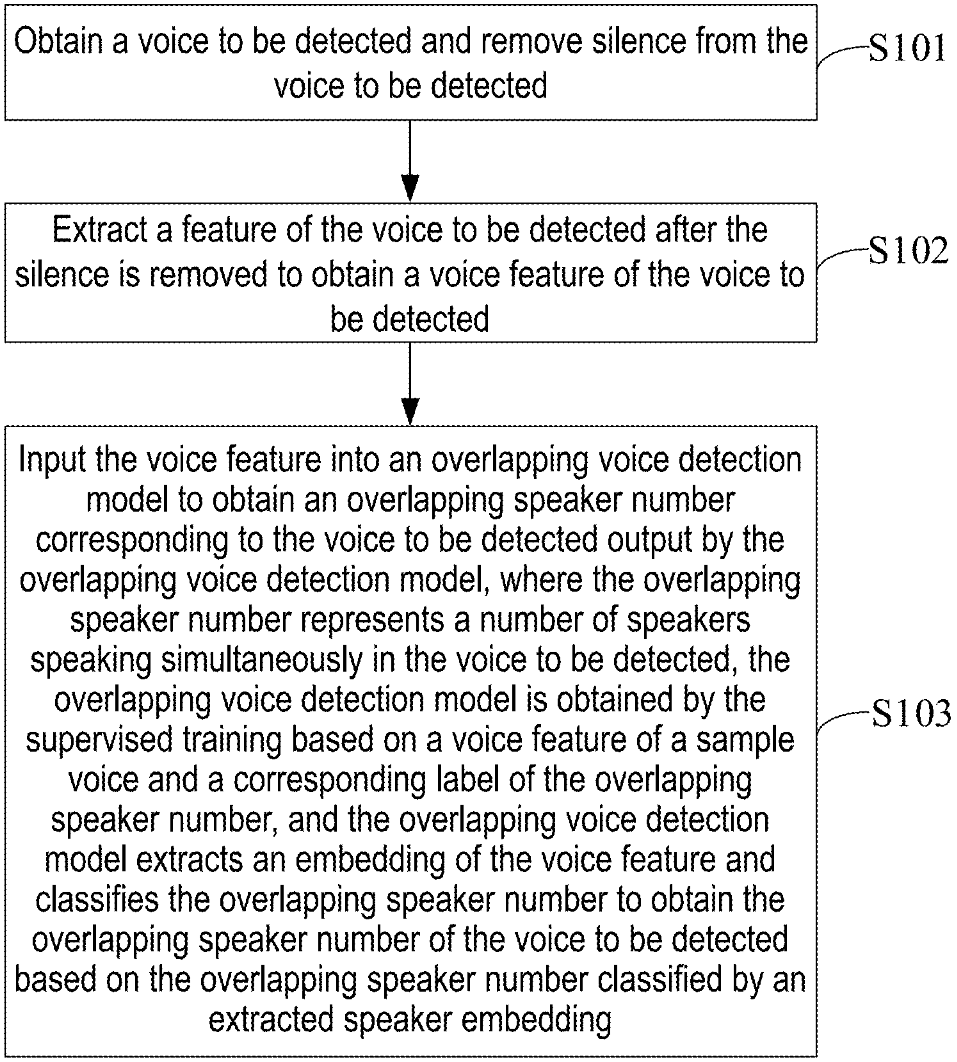
FIG. 1 is one of a flow chart of a multi-speaker overlapping voice detection method provided by the disclosure.

In this regard, the disclosure provides a multi-speaker overlapping voice detection method. FIG. 1 is one of a flow chart of a multi-speaker overlapping voice detection method provided by the disclosure. As shown in FIG. 1, the method includes the following steps. In Step S101, the voice to be detected is obtained, and silence from the voice to be detected is removed. In Step S102, a feature of the voice to be detected is extracted after the silence is removed, to obtain a voice feature of the voice to be detected. In Step S103, the voice feature is input into an overlapping voice detection model to obtain an overlapping speaker number corresponding to the voice to be detected output by the overlapping voice detection model. The overlapping speaker number represents a number of speakers who speak simultaneously in the voice to be detected. The overlapping voice detection model is obtained by the supervised training based on a voice feature of a sample voice and a corresponding label of the overlapping speaker number. The overlapping voice detection model extracts an embedding of the voice feature, and classifies the overlapping speaker number to obtain the overlapping speaker number of the voice to be detected based on the extracted speaker embedding.

Preferably, a voice activity detection algorithm may be adopted to remove the silence from the voice to be detected, where the voice to be detected is the voice for which the overlapping voice detection is required. After the silence from the voice to be detected is removed, a Mel-frequency cepstral coefficient (MFCC) feature extraction may be adopted to extract the feature of the voice to be detected to obtain the voice feature of the voice to be detected. Since the MFCC feature that best matches the auditory feature of the human ear is adopted, the MFCC feature may preserve the feature of the speaker and help the subsequent overlapping voice detection model extract the speaker embedding.

It should be understood that the overlapping speaker number output by the overlapping voice detection model may be one or multiple, for example, two or five. The overlapping voice detection model may detect the overlapping speaker number corresponding to the voice, which may realize the detection of the overlapping voice or the non-overlapping voice and also realize the detection of the number of speakers speaking simultaneously in the overlapping voice. For the subsequent analysis of the extent of confusion in classrooms and meetings, speaker logs, and research on the overlapping perception, the detection of the overlapping voice detection model is a great help.

The method provided by the embodiment of the disclosure obtains the voice feature by removing the silence and extracting the feature of the voice to be detected, extracts the embedding of the voice feature by the overlapping voice detection model, and then classifies the overlapping speaker number to obtain the overlapping speaker number of the voice to be detected based on the extracted speaker embedding, which realizes the detection of the number of speakers speaking simultaneously in the overlapping voice. Furthermore, since the speaker embedding is extracted for the voice, the accuracy of the overlapping voice detection is improved, which has a certain positive impact on the accuracy of speaker logs and overlapping perception tasks.

Based on any of the above embodiments, the overlapping voice detection model includes an embedding extraction model and an overlapping speaker number classification model.

Figure 2:
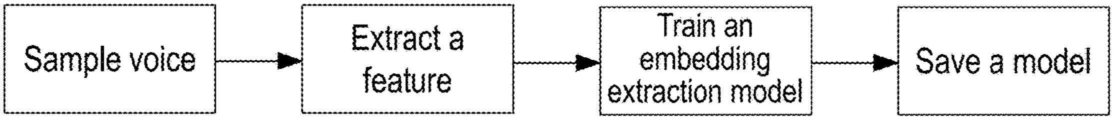
FIG. 2 is a training flow chart of an embedding extraction model provided by the disclosure.

FIG. 2 is a training flow chart of an embedding extraction model provided by the disclosure. As shown in FIG. 2, the embedding extraction model is trained based on the following steps. Based on the voice feature of the sample voice and the corresponding label of the overlapping speaker numbers, a first classification model is trained. The first classification model includes an embedding extraction part and a classification part. The embedding extraction part of the trained first classification model is used as an embedding extraction model.

Figure 3:
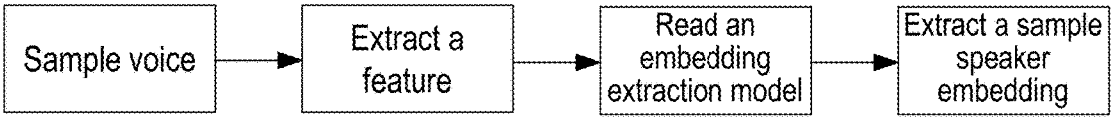
FIG. 3 is a flow chart of embedding extraction provided by the disclosure.
Figure 4:
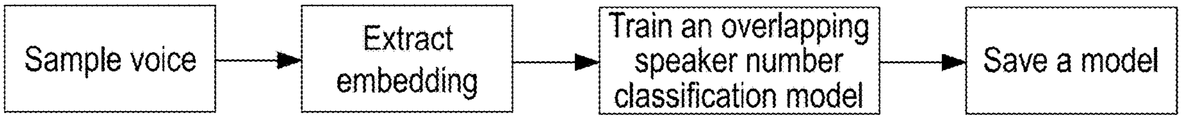
FIG. 4 is a training flow chart of an overlapping speaker number classification model provided by the disclosure.

FIG. 3 is a flow chart of embedding extraction provided by the disclosure. FIG. 4 is a training flow chart of an overlapping speaker number classification model provided by the disclosure. As shown in FIG. 3 and FIG. 4, the overlapping speaker number classification model is trained based on the following steps. The voice feature of the sample voice is input into the embedding extraction model to obtain a sample speaker embedding. Based on the sample speaker embedding and the corresponding label of the overlapping speaker number, a second classification model is trained to obtain the overlapping speaker number classification model.

It should be noted that the adoption goes to train the embedding extraction model first, and then train the overlapping speaker number classification model based on the sample speaker embedding extracted by the embedding extraction model, thereby finally obtaining the overlapping voice detection model, which can further improve the accuracy of the overlapping voice detection.

Based on any of the above embodiments, the first classification model sequentially includes five layers of time-delay neural networks, one statistical pooling layer, two layers of fully connected layers, and one activation function layer, where five layers of time-delay neural networks, one statistical pooling layer, and a first fully connected layer are the embedding extraction part, and the rest are the classification part.

Preferably, when the first classification model is trained, a loss function may adopt cross entropy (CE) to obtain a model with the best training effect as the first classification model that is finally trained, which obtains an embedding extraction model with better performance. The time-delay neural network tdnn may include context acquisition, a fully connected layer, and a Relu activation function.

It should be noted that the input of each layer of the time-delay neural network tdnn is composed of historical, current, and future features, thereby introducing timing information, which may ensure that the speaker embedding may read the timing audio information and further improve the accuracy of the overlapping voice detection.

Based on any of the above embodiments, in order to further improve the accuracy of the overlapping voice detection, the second classification model may sequentially include four layers of one-dimensional convolutional neural networks, two layers of long and short-term memory recurrent neural networks, one fully connected layer, and one activation function layer.

Preferably, the one-dimensional convolutional neural network sequentially includes a one-dimensional convolution, a normalization layer, a relu activation function, and a maximum pooling layer. The fully connected layer sequentially includes a linear layer, a relu activation function, and a linear layer. The activation function layer may adopt a softmax activation function.

Based on any of the above embodiments, the sample voice includes a sample individual voice of a single speaker and a sample overlapping voice of multiple speakers. The sample single voice and the sample overlapping voice are obtained based on the following steps. The individual voice of any speaker is divided into various sub-bands, and silence from the individual voice of the speaker is removed based on the energy of each sub-band and a preset energy threshold. A data set is constructed based on the individual voice of each speaker after the silence is removed. The individual voice of the single speaker is selected from the data set as a sample individual voice. The individual voice of the speakers is randomly selected from the data set and superimposed to obtain sample overlapping voice of the speakers.

Figure 5:
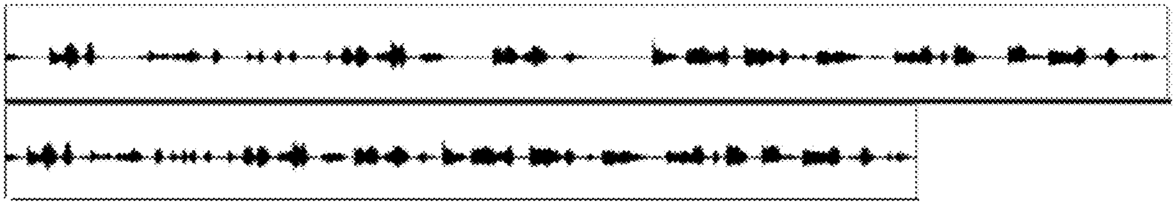
FIG. 5 is an example diagram of an effect of silence removal provided by the disclosure.

It should be noted that there is no public overlapping audio data set currently, and most data sets generated by researchers are the overlapping audio of the single speaker and two speakers, which may not cover the scenario of the speakers overlapping. Therefore, the disclosure first needs to generate the sample overlapping voice. Specifically, the energy-based voice activity detection algorithm is adopted first to detect a silence part in the individual voice data and remove the silence. That is, the collected individual voice of each speaker is divided into various sub-bands first, and the energy of each sub-band is calculated. According to the energy of each sub-band and the preset energy threshold, the silence from the individual voice of each speaker is removed, so that the individual voice of each speaker is obtained after the silence is removed, and thus the data set is constructed. FIG. 5 is an example diagram of an effect of silence removal provided by the disclosure.

Subsequently, the individual voice of the single speaker may be directly selected from the data set as the sample individual voice, and the individual voice of the speakers may be randomly selected from the data set and superposed to obtain the sample overlapping voice of the speakers, so that sample voice of different overlapping speaker numbers may be obtained for the subsequent multi-classification overlapping voice detection model training.

It should be understood that the label of the overlapping speaker number corresponding to the sample individual voice is one, and the label of the overlapping speaker number corresponding to the sample overlapping voice may be directly determined according to a number of individual voice selected by the superposition operation. For example, as the sample overlapping voice corresponding to the label of the overlapping speaker number is three, three individual voice of different speakers from the data set needs to be selected for superposition. The specific superposition method may select two individual voice for superposition first, and then superimpose the third individual voice.

Figure 6:
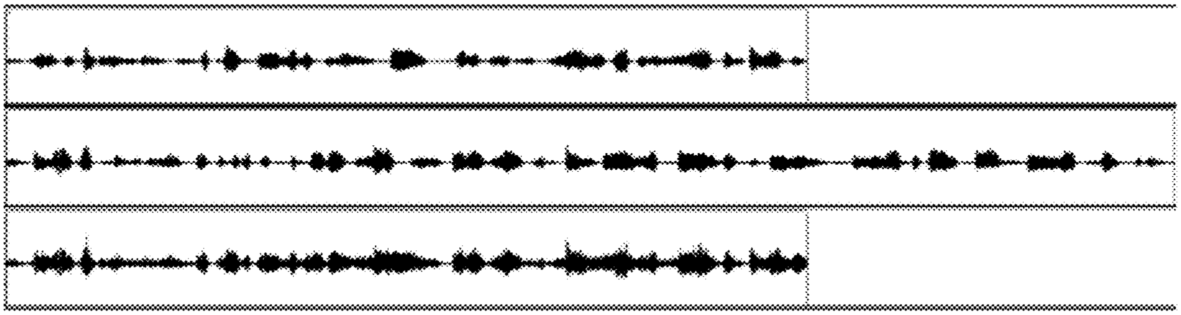
FIG. 6 is an example diagram of an effect of audio superposition provided by the disclosure.

Further, FIG. 6 is an example diagram of an effect of audio superposition provided by the disclosure. As shown in FIG. 6, the top two audios are the randomly selected voice of two individual speakers after the silence is removed, and the third audio is an audio after the voice of the two individual speakers is superimposed. When the superposition operation is performed, the shorter audio is the superimposed audio in each pair of superimposed audios, and the longer audio is superimposed thereon to ensure that the entire audio is the overlapping audio.

Based on any of the above embodiments, the disclosure is described in detail by taking a case where a maximum overlapping speaker number is five as an example. The main purpose of the disclosure is to perform feature extraction and identification on a segment of the audio based on the x-vector, the convolutional neural network (CNN), and the long and short-term memory recurrent neural network (LSTM), and divide the identification result into five categories: single (single speaker), two (two speakers), three (three speakers), four (four speakers), and five (five speakers), so as to provide the overlapping detection for the subsequent speaker logs.

The overlapping voice detection method of the disclosure is mainly divided into two parts: data processing of the audio data set and an XCLSnet five-classification model. The classification model has five steps: extracting the feature training the embedding extraction model, extracting the embedding, training the five-classification model, and obtaining results. The overall processing flow is as follows. First, the audio is input into the overlapping voice detection system to remove the silence from the audio by the voice activity detection algorithm. Afterwards, all the audio is randomly overlapped to generate overlapping samples of one to five speakers, extract the x-vector embedding, and finally obtain the identification result according to the classification model. The result is divided into five categories: single speaker, two speakers, three speakers, four speakers, and five speakers, and finally the audio overlapping situation is analyzed.

Figure 7:
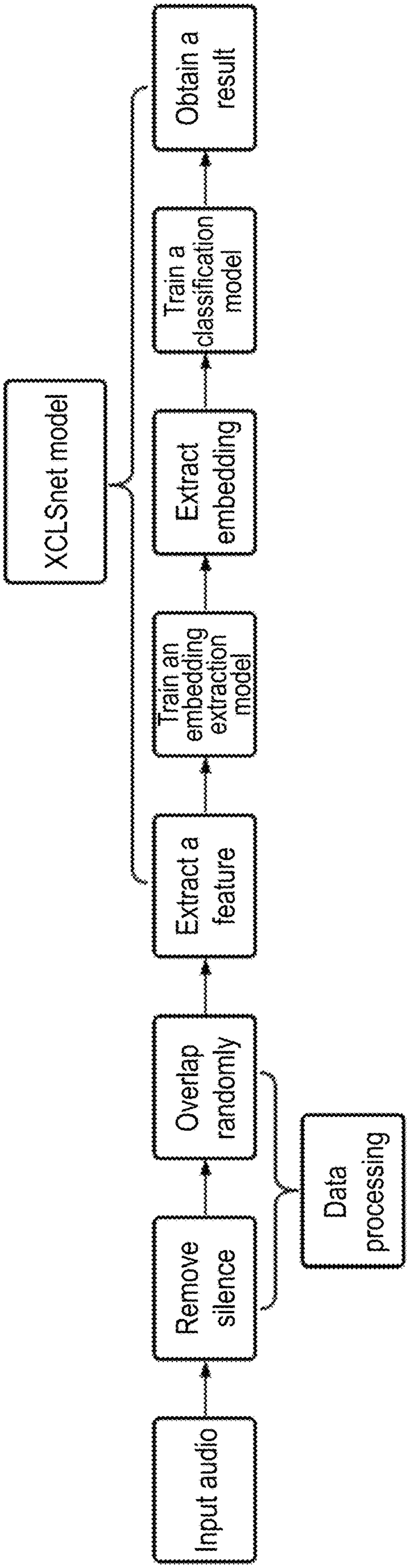
FIG. 7 is a second one of a flow chart of a multi-speaker overlapping voice detection method provided by the disclosure.

FIG. 7 is a second one of a flow chart of a multi-speaker overlapping voice detection method provided by the disclosure. As shown in FIG. 7, the flow chart is specifically divided into the following steps.

1. Data Processing

Since there is no public overlapping audio data set currently, the overlapping audio needs to be generated. First, a voice activity detection (VAD) algorithm is adopted to detect the silent part in the audio and remove the silence. Afterwards, the data set is divided into two parts by random selection, and the overlapping operation is performed in the audio respectively. As the data set is from a real environment, no noise superposition is performed.

1.1 Removing Silence

The criterion of the energy-based voice activity detection is to detect the signal strength and assume that the voice energy is greater than the background noise energy. In this way, when the voice energy is greater than a certain threshold, the voice may be consider to exist. First, a broadband voice is divided into various sub-bands, and a square sum of the energy of each frame is calculated by a spectrum diagram, and then the energy of each sub-band is calculated. A formula is as follows.

$$f(x) = \begin{cases} \text{true}, & E < T \\ \text{False}, & E \geq T \end{cases}$$

In the formula, true means the detection is silence, and false means the detection is not silence. If the energy E is less than the energy threshold T, then f(x) is true silence, otherwise f(x) is false non-silence. The energy threshold T may be set as 15 according to experience. A calculation formula of sub-band energy E is as follows.

$$E = \left(\log_{10}\left(\frac{\sqrt[2]{V}}{L} + 1e - 12\right) * 20.0\right)$$

In the calculation formula, V and L are the square sum of energy of each frame and the length of the sub-band respectively.

The silence and non-silence parts in the audio are determined according to the aforementioned algorithm, and then the overall audio is detected and determined sub-band by sub-band, so as to achieve an effect of distinguishing silence and non-silence. As shown in FIG. 5, after the VAD algorithm removes the silence from the audio sub-band by sub-band, retaining useful information in the audio preserved to the greatest extent and removing silence.

1.2 Random Overlapping

Random overlapping first randomly selects the single speaker from the data set for overlapping, and then superimposes an audio 1 on an audio 2 by the overlay( ) method of AudioSegment to ensure that the entire audio is full of overlapping voice, as shown in FIG. 6. For each pair of the superimposed audios, the shorter audio is the superimposed audio, and the longer audio is superimposed on the shorter audio, to ensure that the entire audio belongs to the superimposed audio. The generation of the overlapping audio for three, four, five or even more speakers is analogous.

The overlapping audio data set generated based on a public data set voxceleb1 is shown in the following table.

TABLE 1

Overlapping voice data set (including training set and test set)

| | | Single | Two-Overlap | Three-overlap | Four-overlap | Five-overlap |
|---|---|---|---|---|---|---|
| 1V5-382560 | Training set-360375 | 72075 | 72075 | 72075 | 72075 | 72075 |
| | Test set-10000 | 2000 | 2000 | 2000 | 2000 | 2000 |

2. XCLSnet Model

Figure 8:
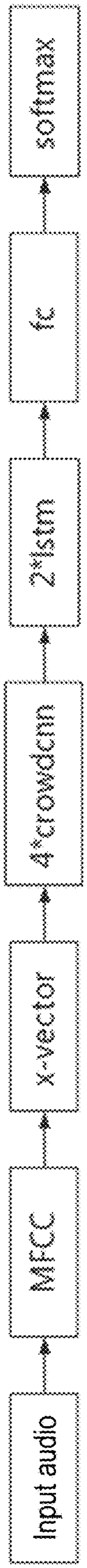
FIG. 8 is a structural diagram of an XCLSnet model provided by the disclosure.

The XCLSnet model is mainly divided into the embedding extraction and the five-classification. FIG. 8 is a structural diagram of an XCLSnet model provided by the disclosure.

2.1 MFCC Feature Extraction

After the audio data is processed, the feature is extracted for each audio segment. First, the MFCC, which best matches the auditory feature of the human ear, is used in the feature extraction to obtain a 24-dimensional feature vector preserving the feature of the speaker to realize the subsequent x-vector embedding training.

2.2 Training an Embedding Extraction Model

As shown in FIG. 2, the 360,375 overlapping audios (72,075 of which are balanced for each category, and the data set is shown in Table 1) are preprocessed in advance to extract the 24-dimensional MFCC feature and train an x-vector embedding extraction model.

The x-vector model (that is, the aforementioned first classification model) includes five layers of time-delay neural networks tdnn, one statistical pooling layer, two layers of fully connected layers, and a softmax activation function. The loss function is CE. A formula is as follows.

$$x = [x_1, x_2, \ldots\ldots x_t]$$

$$y = \mathcal{F}(x)$$

In the formulas, $x_t$ represents the MFCC feature vector of the voice signal at time t, $\mathcal{F}(\bullet)$ represents a mapping function of the x-vector model after five layers of time-delay neural networks tdnn, one statistical pooling layer, and one fully connected layer, and y represents an output vector of the model.

1. The input of each layer of time-delay neural networks tdnn is composed of historical, current, and future features, thereby introducing timing information. The input of the Frame 1 layer model is the 24-dimensional MFCC feature and a total of five frames before and after, so the frame1 input is 120 dimensions and the output is 512 dimensions. The input of frame2 is a 512-dimensional feature and a total of three frames before and after, so the input is 1536 dimensions, and the output is 512 dimensions. The rest of other frame layers are analogous.
2. The statistical pooling layer takes the mean and standard deviation of the time-delay neural networks tdnn output of all frames of the input sequence, and then concatenates the two to obtain the sentence-level feature expression.

A structure of the x-vector model is shown in the following table. Each frame layer has a context feature.

TABLE 2 x-vector model structural table

| Layer | Layer context | Total context | Input × output |
|---|---|---|---|
| frame1 | {t − 2, t + 2} | 5 | 120 × 512 |
| frame2 | {t − 2, t, t + 2} | 9 | 1536 × 512 |
| frame3 | {t − 3, t, t + 3} | 15 | 1536 × 512 |
| frame4 | {t} | 15 | 512 × 512 |
| frame5 | {t} | 15 | 512 × 1500 |
| stats pooling | [0, T) | T | 1500T × 3000 |
| segment6 | {0} | T | 3000 × 512 |
| segment7 | {0} | T | 512 × 512 |
| softmax | {0} | T | 512 × 5 |

In Table 2, the frame layer is a time-delay neural network tdnn, including context acquisition, a fully connected layer, and a Relu activation function:

1. According to the layer context of each layer input, the previous and next frames of the current frame are obtained and spliced together
2. The input of the fully connected layer is the input of the time-delay neural network tdnn layer multiplied by the length of the context, and the output is 512 dimensions.

Finally, the model with the best training effect is saved for subsequent embedding extraction.

2.3 Embedding Extraction

As shown in FIG. 3, the x-vector model trained in the previous step is used. The saved model with the best effect is read first, the 24-dimensional MFCC feature and the label of the overlapping audio are loaded and input into the model to extract the x-vector, and the segment6 layer is extracted as the output of the model. Finally, a 512-dimensional feature vector is obtained, which ensures that the x-vector enables to read the timing audio information.

2.4 Training an Overlapping Speaker Number Classification Model

As shown in FIG. 4, the extracted x-vector embedding is loaded into the model, and the second classification model is trained to obtain the overlapping speaker number classification model, where the second classification model includes four layers of one-dimensional CNN, two layers of LSTM recurrent neural network, and a softmax activation function. A formula is as follows.

$$g = \mathcal{S}(W(h_T) + b)$$

In the formula, $h_T$ represents the last hidden state of LSTM, W and b are the weight and biase of the classification model respectively, and $\mathcal{S}$ is the softmax activation function. The output of the one-dimensional convolution and the LSTM layer may be expressed as follows.

$$h_t = LSTM(h_{t-1}, z)$$

$$z_i = \sum_{j=0}^{k-1} w_j y_{i+j}$$

In the formulas, $h_t$ is the hidden state of the LSTM layer at time step t, z is the vector output by the last convolutional layer, $w_j$ is the weight of the convolution kernel, k is the size of the convolution kernel, and $z_i$ is the output of the convolutional layer at position i.

Figure 9:
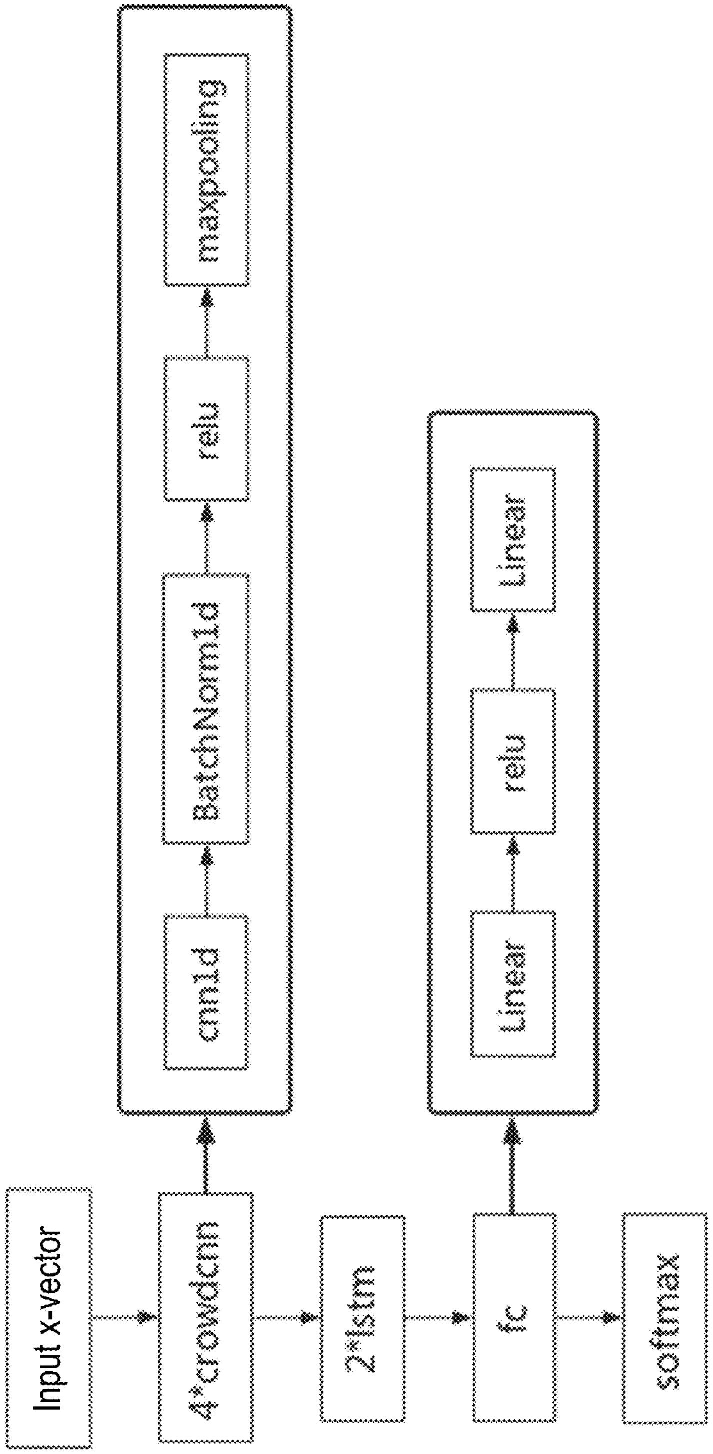
FIG. 9 is a structural diagram of a classification model for an overlapping speaker number provided by the disclosure.

FIG. 9 is a structural diagram of a classification model for an overlapping speaker number provided by the disclosure. As shown in FIG. 9, the overlapping speaker number classification model, which is the five-classification model, includes:

(1) crowdcnn includes a one-dimensional convolution, a normalization layer, a relu activation function, and a maximum pooling layer. A total of four crowdcnns are stacked. The input and output are 1*512, 512*256, 256*256, and 256*128 respectively. A size of the convolution kernel of the one-dimensional convolutional layer is 3, a size of the convolution kernel of the maximum pooling is 2, and a size of stride is also 2.

(2) lstm has two layers, a hidden layer is 128, and 4096 dimensions are input.

(3) fc includes two linear layers and a relu activation function, a first linear layer is 128*64, and the input and output of a last linear layer are 64*5.

It should be noted that the disclosure processes the audio data by the VAD algorithm and the random overlapping voice to generate a five-classification overlapping voice data set based on a voxceleb1 public data set, which is convenient for the subsequent research on the overlapping voice detection with more categories. The disclosure proposes the overlapping voice detection model, XCLSnet, to remove the silence from the audio by the VAD algorithm, imports the audio into the XCLSnet model, adopts the x-vector embedding extraction model to extract the x-vector embedding from the audio, and then inputs the embedding into the CNN and the LSTM network to obtain a classification result of the speakers overlapping of the audio. The classification result has a certain positive impact on the accuracy of speaker logs and overlapping perception tasks.

Figure 10:
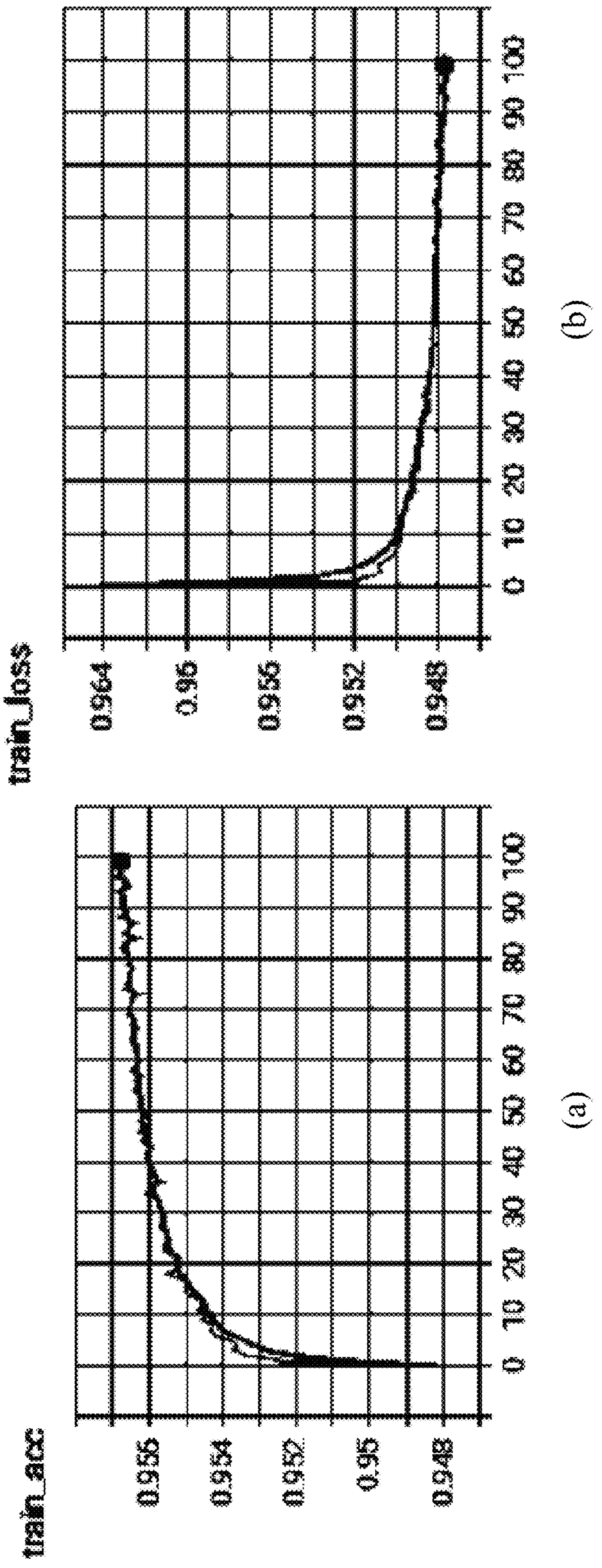
FIG. 10 is a comparison chart of accuracy and a comparison chart of a loss value of an overlapping voice detection model provided by the disclosure and a conventional model.

Based on any of the above embodiments, the model is in a data set based on the random overlapping of voxceleb, with a learning rate of 0.0001, an epoch of 100, and a batch_size of 32. FIGS. 10(*a*) and (*b*) are respectively a comparison chart of accuracy and a comparison chart of a loss value of an overlapping voice detection model provided by the disclosure and a conventional model. As shown in FIGS. 10(*a*) and (*b*), it may be seen that the accuracy and the loss begin to converge at epoch=90. The result on the test set of the same distribution is shown in the following table. Since no baseline model related to the overlapping voice detection of the speakers has been proposed, the two-classification overlapping detection bcnn is used as a baseline model, and experiments are conducted on the two-classification overlapping voice detection and the five-classification overlapping detection respectively.

TABLE 3

XCLSnet model test result

| Task | Model | Acc | Loss |
|---|---|---|---|
| 1v1 | XCLSnet | 0.96 | 0.21 |
| | Bcnn | 0.92 | 0.84 |
| 1v5 | XCLSnet | 0.95 | 0.958 |
| | Bcnn | 0.68 | 1.02 |

In Table 3, 1v1 represents the two-classification overlapping voice detection task of distinguishing overlapping and non-overlapping, and 1v5 represents the five-classification overlapping voice detection task. As can be seen from the table, the effect of the proposed XCLSnet model is 3% better than the effect of the Bcnn model for 1v1, and is 27% better than the effect of the Bcnn model for 1v5 of the speakers overlapping detection. The reason is that the x-vector embedding is extracted from the audio, and the LSTM network is added to increase the timing information.

Figure 11:
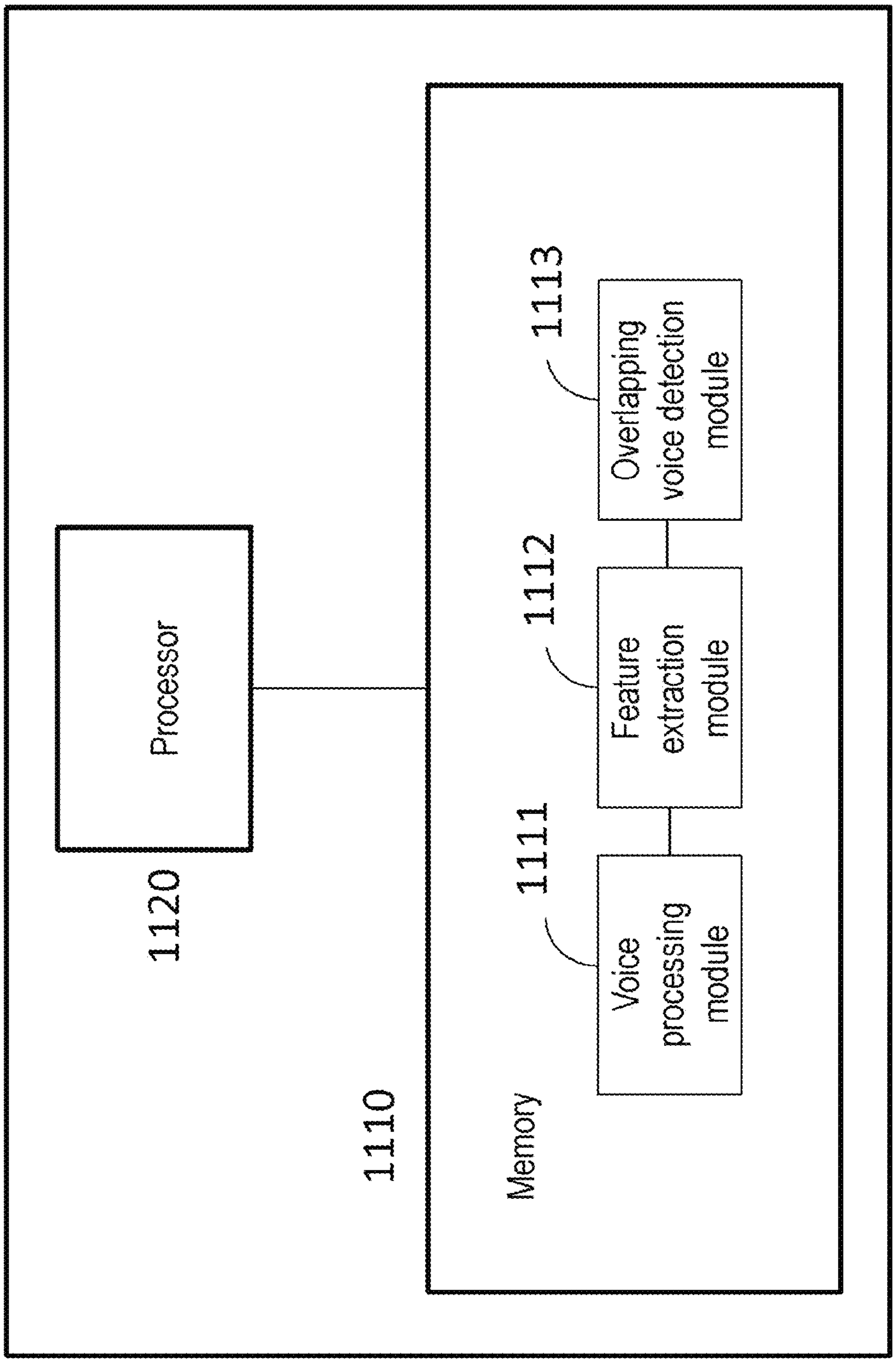
FIG. 11 is an architecture diagram of a multi-speaker overlapping voice detection system provided by the disclosure.

Based on any of the above embodiments, the disclosure provides a multi-speaker overlapping voice detection system. FIG. 11 is an architecture diagram of a multi-speaker overlapping voice detection system provided by the disclosure. As shown in FIG. 11, the system includes a processor 1120 and a memory 1110. The processor 1120 is coupled to the memory 1110. The processor 1120 is configured to execute the modules stores in the memory. The memory 1110 stores multiple modules such as a voice processing module 1111, a feature extraction module 1112, and an overlapping voice detection module 1113. The voice processing module 1111 is configured to obtain the voice to be detected and remove the silence from the voice to be detected. The feature extraction module 1112 is configured to extract the feature of the voice to be detected after the silence is removed, so as to obtain the voice feature of the voice to be detected. The overlapping voice detection module 1113 is configured to input the voice feature into the overlapping voice detection model to obtain the overlapping speaker number corresponding to the voice to be detected output by the overlapping voice detection model. The overlapping speaker number represents the number of speakers speaking simultaneously in the voice to be detected. The overlapping voice detection model is obtained by the supervised training based on the voice feature of the sample voice and corresponding labels of the overlapping speaker number. The overlapping voice detection model extracts the embedding of the voice feature, and classifies the overlapping speaker number based on the extracted speaker embedding to obtain the overlapping speaker number of the voice to be detected.

It should be understood that the detailed functional implementation of each of the aforementioned modules may be found in the introduction of the aforementioned method embodiment, and is not repeated herein.

In addition, an embodiment of the disclosure provides another multi-speaker overlapping voice detection device, which includes a memory and a processor. The memory is configured to store a computer program. The processor is configured to implement the method in the aforementioned embodiment when executing the computer program.

In addition, the disclosure further provides a computer-readable storage medium, on which a computer program is stored. When the computer program is executed by the processor, the method in the aforementioned embodiment is implemented.

Based on the method in the aforementioned embodiment, an embodiment of the disclosure provides a computer program product. When the computer program product runs on the processor, the processor executes the method in the aforementioned embodiment.

Based on the above, the disclosure can be implements as the following:

1. Meeting recording and transcription: In a multi-person meetings or discussions, with the help of microphone equipment, the number of overlapping speakers can be accurately identified based on the overlapping speaker identification algorithm, thereby improving the accuracy of the automatic speech transcription system and improving the work efficiency of multi-person meetings.
2. Intelligent assistant and voice control: The intelligent assistant needs to identify the number of speakers to distinguish the source of the instruction and avoid confusion. Moreover, in an environment where multiple people are speaking at the same time, the intelligent assistant can better process and respond to instructions.
3. Intelligent voice interaction system: The intelligent voice interaction system needs to understand and participate in multi-person conversations. Identifying the number of overlapping speakers can help the robot better understand the conversation structure, make appropriate responses, and improve the naturalness and fluency of the interaction. In general, the above technical solution conceived by the disclosure has the following beneficial effects compared with the related art. The disclosure provides the multi-speaker overlapping voice detection method and the system thereof, which obtains the voice feature by removing the silence and extracting the feature of the voice to be detected, extracts the embedding of the voice feature by the overlapping voice detection model, and then classifies the overlapping speaker number to obtain the overlapping speaker number of the voice to be detected based on the extracted speaker embedding, which realizes the detection of the number of speakers speaking simultaneously in the overlapping voice. Furthermore, since the speaker embedding is extracted for the voice, the accuracy of the overlapping voice detection is improved, which has a certain positive impact on the accuracy of speaker logs and overlapping perception tasks.

It will be easily understood by people skilled in the art that the above description is only a preferred embodiment of the disclosure and is not intended to limit the disclosure. Any modifications, equivalent substitutions, and improvements made within the spirit and principles of the disclosure should be included in the protection scope of the disclosure.

What is claimed is:

1. A multi-speaker overlapping voice detection method, comprising:

obtaining a voice to be detected and removing silence from the voice to be detected;

extracting a feature of the voice to be detected after silence removal to obtain a voice feature of the voice to be detected;

inputting the voice feature into an overlapping voice detection model to obtain an overlapping speaker number corresponding to the voice to be detected output by the overlapping voice detection model, wherein the overlapping speaker number represents a number of speakers speaking simultaneously in the voice to be detected;

wherein the overlapping voice detection model is obtained by a supervised training based on a voice feature of a sample voice and a corresponding label of the overlapping speaker number, and the overlapping voice detection model extracts an embedding of the voice feature and classifies the overlapping speaker number to obtain the overlapping speaker number of the voice to be detected based on the overlapping speaker number classified by an extracted speaker embedding, wherein the overlapping voice detection model comprises an embedding extraction model and an overlapping speaker number classification model, wherein the embedding extraction model is trained based on following steps:

training a first classification model based on the voice feature of the sample voice and the corresponding label of the overlapping speaker number, wherein the first classification model comprises an embedding extraction part and a classification part; and using the embedding extraction part of the trained first classification model as the embedding extraction model; and the overlapping speaker number classification model is trained based on following steps:

inputting the voice feature of the sample voice into the embedding extraction model to obtain a sample speaker embedding; and training a second classification model to obtain the overlapping speaker number classification model based on the sample speaker embedding and the corresponding label of the overlapping speaker number.

2. The method according to claim 1, wherein the first classification model sequentially comprises five layers of time-delay neural networks, one statistical pooling layer, two layers of fully connected layers, and one activation function layer, wherein the five layers of time-delay neural networks, the one statistical pooling layer, and a first fully connected layer are the embedding extraction part, and the rest are the classification part.

3. The method according to claim 1, wherein the second classification model sequentially comprises four layers of one-dimensional convolutional neural networks, two layers of long and short-term memory recurrent neural networks, one fully connected layer, and one activation function layer.

4. The method according to claim 1, wherein the sample voice comprises a sample individual voice of a single speaker and a sample overlapping voice of a plurality of speakers; and the sample individual voice and the sample overlapping voice are obtained based on following steps:

dividing an individual voice of any speaker into various sub-bands, and removing the silence form the individual voice of any speaker based on an energy of each sub-band and a preset energy threshold;

constructing a data set based on an individual voice of each speaker after removing the silence;

selecting an individual voice of a single speaker from the data set as a sample individual voice; and selecting an individual voice of a plurality of speakers randomly from the data set and superimposing to obtain the sample overlapping voice of the plurality of speakers.

5. The method according to claim 1, wherein the sample voice comprises a sample individual voice of a single speaker and a sample overlapping voice of a plurality of speakers; and the sample individual voice and the sample overlapping voice are obtained based on following steps:

dividing an individual voice of any speaker into various sub-bands, and removing the silence form the individual voice of any speaker based on an energy of each sub-band and a preset energy threshold;

constructing a data set based on an individual voice of each speaker after removing the silence;

selecting an individual voice of a single speaker from the data set as a sample individual voice; and selecting an individual voice of a plurality of speakers randomly from the data set and superimposing to obtain the sample overlapping voice of the plurality of speakers.

6. The method according to claim 2, wherein the sample voice comprises a sample individual voice of a single speaker and a sample overlapping voice of a plurality of speakers; and the sample individual voice and the sample overlapping voice are obtained based on following steps:

dividing an individual voice of any speaker into various sub-bands, and removing the silence form the individual voice of any speaker based on an energy of each sub-band and a preset energy threshold;

constructing a data set based on an individual voice of each speaker after removing the silence;

selecting an individual voice of a single speaker from the data set as a sample individual voice; and selecting an individual voice of a plurality of speakers randomly from the data set and superimposing to obtain the sample overlapping voice of the plurality of speakers.

7. The method according to claim 3, wherein the sample voice comprises a sample individual voice of a single speaker and a sample overlapping voice of a plurality of speakers; and the sample individual voice and the sample overlapping voice are obtained based on following steps:

dividing an individual voice of any speaker into various sub-bands, and removing the silence form the individual voice of any speaker based on an energy of each sub-band and a preset energy threshold;

constructing a data set based on an individual voice of each speaker after removing the silence;

selecting an individual voice of a single speaker from the data set as a sample individual voice; and selecting an individual voice of a plurality of speakers randomly from the data set and superimposing to obtain the sample overlapping voice of the plurality of speakers.

8. A multi-speaker overlapping voice detection system, comprising:

a memory and a processor, wherein the processor is coupled to the memory, and the processor is configured to execute:

a voice processing module to obtain a voice to be detected and remove silence from the voice to be detected;

a feature extraction module to extract a feature of the voice to be detected after silence removal, to obtain a voice feature of the voice to be detected; and an overlapping voice detection module to input the voice feature into an overlapping voice detection model to obtain an overlapping speaker number corresponding to the voice to be detected output by the overlapping voice detection model, wherein the overlapping speaker number represents a number of speakers speaking simultaneously in the voice to be detected;

wherein an overlapping voice detection model is obtained by a supervised training based on a voice feature of a sample voice and a corresponding overlapping speaker number label, the overlapping voice detection model performs embedding extraction on the voice feature, and classifies the overlapping speaker number based on an extracted speaker embedding to obtain the overlapping speaker number of the voice to be detected, wherein the overlapping voice detection model comprises an embedding extraction model and an overlapping speaker number classification model, and the system further comprises an embedding extraction training module and a classification training module;

wherein the processor is further configured to execute:

the embedding extraction training module to train a first classification model based on the voice feature of the sample voice and a corresponding label of the overlapping speaker number, wherein the first classification model comprises an embedding extraction part and a classification part, and use the embedding extraction part of the trained first classification model as the embedding extraction model; and the classification training module to input the voice feature of the sample voice into the embedding extraction model to obtain a sample speaker embedding, and train a second classification model to obtain the overlapping speaker number classification model based on the sample speaker embedding and the corresponding label of the overlapping speaker number.

9. The system according to claim 8, wherein the first classification model of the embedding extraction training module sequentially comprises five layers of time-delay neural networks, one statistical pooling layer, two layers of fully connected layers, and one activation function layer, wherein the five layers of time-delay neural networks, the one statistical pooling layer, and a first fully connected layer are the embedding extraction part, and the rest are the classification part.

10. The system according to claim 8, wherein the second classification model of the classification training module sequentially comprises four layers of one-dimensional convolutional neural networks, two layers of long and short-term memory recurrent neural networks, one fully connected layer, and one activation function layer.

11. The system according to claim 8, wherein the sample voice comprises a sample individual voice of a single speaker and a sample overlapping voice of a plurality of speakers; and the system further comprises a sample voice acquisition module, configured to:

divide the individual voice of any speaker into various sub-bands, and remove silence form an individual voice of any speaker based on an energy of each sub-band and a preset energy threshold;

construct a data set based on an individual voice of each speaker after silence removal;

select an individual voice of a single speaker from the data set as a sample individual voice; and select an individual voice of the plurality of speakers randomly from the data set and superimpose to obtain the sample overlapping voice of the plurality of speakers.

12. The system according to claim 8, wherein the sample voice comprises a sample individual voice of a single speaker and a sample overlapping voice of a plurality of speakers; and the system further comprises a sample voice acquisition module, configured to:

divide the individual voice of any speaker into various sub-bands, and remove silence form an individual voice of any speaker based on an energy of each sub-band and a preset energy threshold;

construct a data set based on an individual voice of each speaker after silence removal;

select an individual voice of a single speaker from the data set as a sample individual voice; and select an individual voice of the plurality of speakers randomly from the data set and superimpose to obtain the sample overlapping voice of the plurality of speakers.

13. The system according to claim 9, wherein the sample voice comprises a sample individual voice of a single speaker and a sample overlapping voice of a plurality of speakers; and the system further comprises a sample voice acquisition module, configured to:

divide the individual voice of any speaker into various sub-bands, and remove silence form an individual voice of any speaker based on an energy of each sub-band and a preset energy threshold;

construct a data set based on an individual voice of each speaker after silence removal;

select an individual voice of a single speaker from the data set as a sample individual voice; and select an individual voice of the plurality of speakers randomly from the data set and superimpose to obtain the sample overlapping voice of the plurality of speakers.

14. The system according to claim 10, wherein the sample voice comprises a sample individual voice of a single speaker and a sample overlapping voice of a plurality of speakers; and the system further comprises a sample voice acquisition module, configured to:

divide the individual voice of any speaker into various sub-bands, and remove silence form an individual voice of any speaker based on an energy of each sub-band and a preset energy threshold;

construct a data set based on an individual voice of each speaker after silence removal;

select an individual voice of a single speaker from the data set as a sample individual voice; and select an individual voice of the plurality of speakers randomly from the data set and superimpose to obtain the sample overlapping voice of the plurality of speakers.

* * * * *